United States Patent
Chester et al.

(10) Patent No.: US 8,171,272 B1
(45) Date of Patent: May 1, 2012

(54) CRITICAL PRE-OS DRIVER VERIFICATION

(75) Inventors: Robert Craig Chester, Auckland (NZ); Eugene Manko, Auckland (NZ)

(73) Assignee: Symantec Corporation, Mountain View, CA (US)

(*) Notice: Subject to any disclaimer, the term of this patent is extended or adjusted under 35 U.S.C. 154(b) by 482 days.

(21) Appl. No.: 12/421,479

(22) Filed: Apr. 9, 2009

(51) Int. Cl.
 *G06F 15/177* (2006.01)
(52) U.S. Cl. .................................. 713/1; 713/2
(58) Field of Classification Search .................. 713/1, 2
 See application file for complete search history.

(56) References Cited

U.S. PATENT DOCUMENTS

| | | | |
|---|---|---|---|
| 2002/0092014 A1* | 7/2002 | Shibusawa et al. | 717/174 |
| 2006/0168576 A1* | 7/2006 | Phung et al. | 717/168 |
| 2007/0169116 A1* | 7/2007 | Gujarathi et al. | 717/174 |
| 2008/0301426 A1* | 12/2008 | Arges et al. | 713/2 |

* cited by examiner

*Primary Examiner* — Chun Cao
(74) *Attorney, Agent, or Firm* — Brill Law Office; Jeffrey Brill

(57) ABSTRACT

Before booting from a main OS into a pre-OS, a pre-OS management component verifies that all critical drivers are present in the pre-OS. The pre-OS management component identifies the hardware devices present on the computer on which the pre-OS is to be booted, and determines which drivers are installed in the pre-OS. If any drivers for critical devices are missing, the pre-OS management component provides a detailed report so that that the user can locate the missing drivers and add them to the pre-OS. In another embodiment, the pre-OS management component automatically obtains and installs the missing drivers.

19 Claims, 3 Drawing Sheets

CRITICAL PRE-OS DRIVER VERIFICATION

TECHNICAL FIELD

This invention pertains generally to pre-OS management, and more specifically to verifying that critical device drivers are present prior to booting a pre-OS.

BACKGROUND

Booting an operating system (OS) on a computer sometimes involves first booting a small OS (pre-OS) that uses a minimal amount of memory. A pre-OS typically boots quickly and without complication, and can perform various configuration tasks prior to booting the main OS. Examples of tasks often performed by a pre-OS are scanning for malicious code (particularly scanning of the boot sector) and performing system updates. After the pre-OS performs these critical start-up operations quickly and efficiently, the main OS is booted. A pre-OS can also be booted into from a main OS to perform various, non-startup lower level operations. For example, it can be desirable to boot into a pre-OS from a main OS to handle certain types of disk imaging tasks.

DOS was originally the most common pre-OS. Versions of Microsoft Windows® through Windows 95 used DOS as a pre-OS. As DOS is a 16-bit OS, it is not as functional as a pre-OS for 32 and 64 bit environments as would be desirable. Microsoft later released Windows Preinstallation Environment (WinPE), a lightweight version of Windows XP (or of other, similar versions of Windows). WinPE was intended as a 32-bit (or 64-bit) replacement for DOS during the installation phase of Windows, and can be booted via PXE, CD-ROM, USB flash drive or hard disk.

Originally, WinPE was used mostly by equipment manufacturers to preinstall Windows client operating systems on user computers. WinPE is now widely available, and is used for operations such as deployment of workstations and servers in large corporations, as a platform on which to run 32-bit or 64-bit recovery tools, and as a platform for running 32-bit or 64-bit disk management activities. Other 32-bit and 64-bit pre-OSs exist as well, such as various pre-OS versions of Linux, UNIX, Solaris, etc.

The above-mentioned types of disk management activities are often controlled from a remote management server. In order to perform certain disk operations such as restoring a full system image (in the context of, e.g., a backup, clone or provisioning operation), it is necessary to have unimpeded access to the underlying system hardware. This access is typically obtained by booting into a pre-OS such as WinPE or Linux. These pre-OS environments require device drivers to access the underlying hardware, such as the disk drives and the network.

When the system is being instructed to boot into a pre-OS remotely by a management server, it is important that the critical drivers be present in the pre-OS. This ensures both that communication can be maintained with the management server, and that the intended task (e.g. restoring an image) can be performed. In some pre-OS environments (e.g., uncompressed WinPE), the pre-OS cannot boot successfully without the correct drivers for the storage devices that are present on the computer. As a result, the system is in an un-bootable state unless the storages drivers are present in the pre-OS. Under other systems, a missing storage driver may not cause the boot into the pre-OS to fail, but can still cause an unintended reordering of the disk numbers, such that an image restore operation can inadvertently destroy the contents of one or more disks.

It would be desirable to address these issues.

SUMMARY

Before booting from a main OS into a pre-OS (such as Linux or WinPE), a pre-OS management component verifies that all critical drivers are present in the pre-OS. More specifically, the pre-OS management component ensures that that storage and network drivers are available for the hardware on which the pre-OS is to be booted. If any critical drivers are missing, the pre-OS management component provides a detailed report so that that a user can locate the missing drivers and add them to the pre-OS. In another embodiment, the pre-OS management component automatically obtains and installs the missing drivers.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
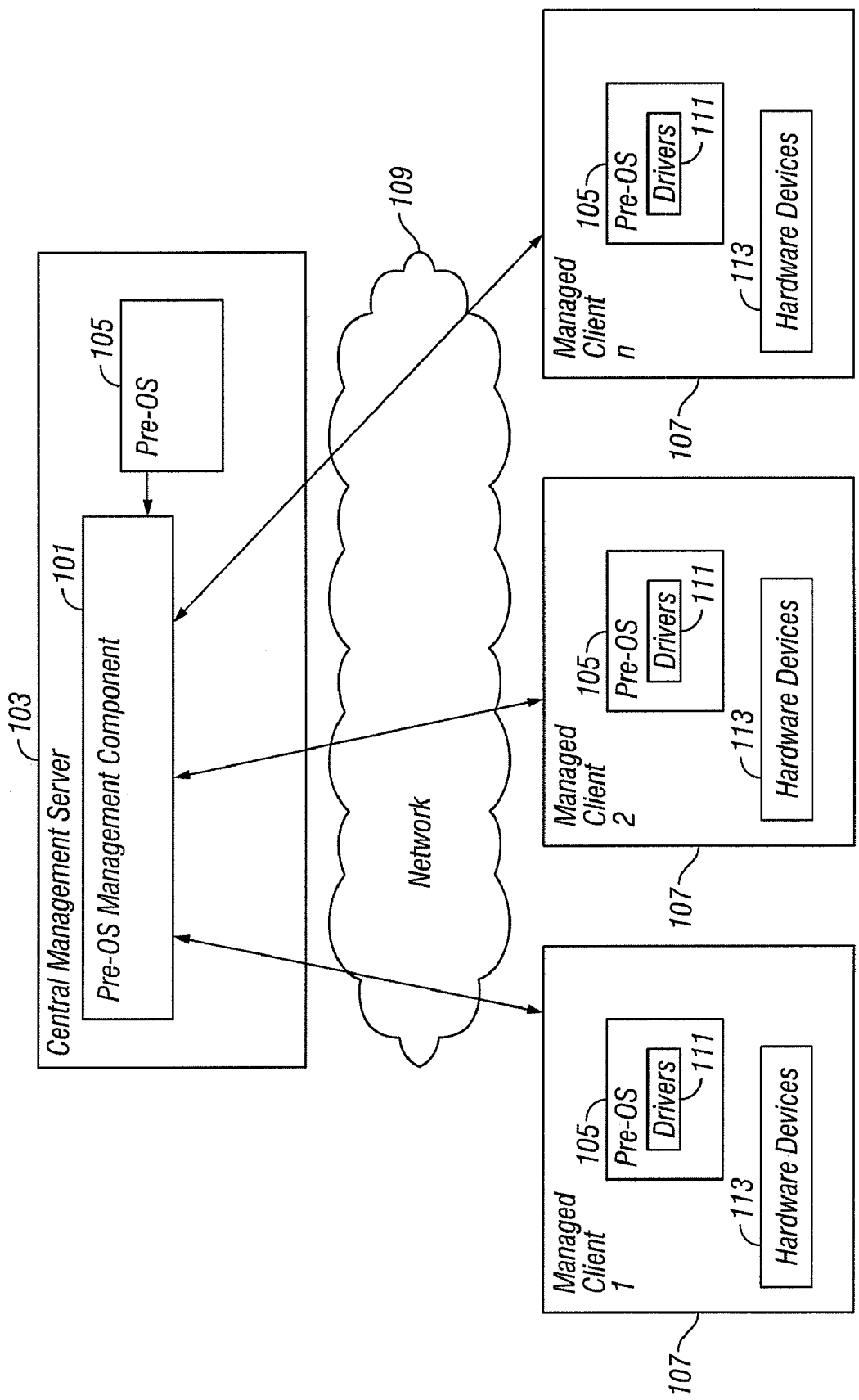
FIG. 1 is a block diagram illustrating a pre-OS management component running on a central management server, configured to manage the booting of a pre-OS on a plurality of managed clients, according to some embodiments of the present invention.

FIG. 1 illustrates a pre-OS management component 101 running on a central management server 103, configured to manage the successful booting of a pre-OS 105 on a plurality of managed clients 107, according to some embodiments of the present invention. It is to be understood that although the pre-OS management component 101 is illustrated in FIG. 1 as a separate entity, the pre-OS management component 101 represents a collection of functionalities which can be implemented as software, hardware, firmware or any combination of these. Where the pre-OS management component 101 is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

As illustrated in FIG. 1, a pre-OS management component 101 runs on a management server 103, the management server 103 being in communication with a group of managed clients 107 over a network 109. The pre-OS management component 101 manages the booting of a pre-OS 105 on the managed clients 107, thereby enabling operations such as controlling disk management activities from the remote management server 103. It is to be understood that although only three managed clients 107 are illustrated, more or fewer managed clients 107 can be deployed as desired. It is to be further understood that although the pre-OS management component 101 is illustrated as running on a management server 103, in other embodiments the pre-OS management component 101 can run on a client 107 or be distributed between multiple servers 103 and/or clients 107 as desired.

In order to enable the successful booting of the pre-OS 105 on a managed client 107, the pre-OS management component 101 ensures that the files comprising the pre-OS 105 are located thereon (e.g., all files comprising WinPE). As discussed in greater detail below, the pre-OS management component 101 can do so, for example, by transmitting the pre-OS 105 files to the client 107 over the network 109, or by determining that the pre-OS 105 files are already resident on the client 107. Note that where the pre-OS 105 is to be booted over the network 109 (e.g., using PXE) none of the pre-OS 105 files will be present on the client 107 until the client boots into the pre-OS 105 for the first time.

The pre-OS management component 101 also determines whether the critical drivers 111 are present (i.e., the drivers 111 for any hardware devices 113 present on the client 107 that are critical to the pre-OS 105 for performing its operations). The pre-OS management component 101 does not attempt to boot into the pre-OS 105 if critical drivers 111 are missing. This is to prevent the client 107 from losing contact with the pre-OS management component 101, and to prevent errors occurring on the client 107 during the pre-OS 105 boot process that would result in a loss of centralized control.

In one embodiment, the user of a managed client 107 is informed if the pre-OS 105 lacks one or more critical drivers 111 (e.g., via a report that gives the details needed by the user to locate and provide the missing driver(s) 111 to the pre-OS 105). In other embodiments, the pre-OS management component 101 attempts to locate and install any missing drivers 111 automatically. If all of critical drivers 111 are present, the pre-OS management component 101 initiates the normal booting of the pre-OS 105 on the client 107.

Figure 2:
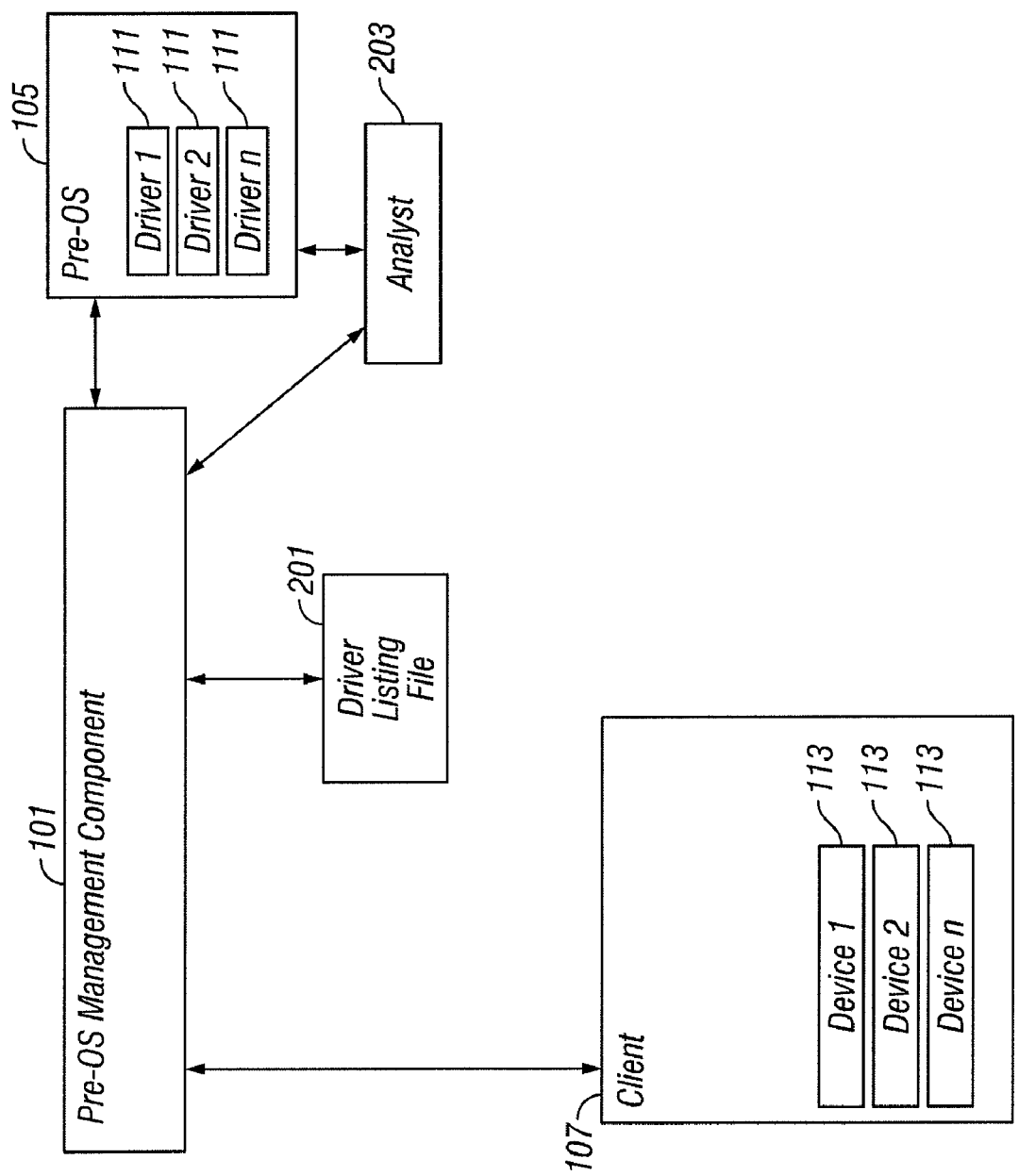
FIG. 2 is a block diagram illustrating a pre-OS management component determining whether critical drivers are present on a client, according to some embodiments of the present invention.

FIG. 2 illustrates the pre-OS management component 101 determining whether the critical drivers 111 are present in greater detail. To determine whether all critical drivers 111 are present, the pre-OS management component 101 identifies hardware devices 113 that are present on the client 107 on which the pre-OS 105 is to be booted, and detects which drivers 111 are present in the pre-OS 105. The pre-OS management component 101 matches identified hardware devices 113 against detected drivers 111, in order to determine whether any drivers 111 for critical hardware devices 113 (i.e., critical drivers 111) are missing.

Detection of the hardware devices 113 on the client 107 on which the pre-OS 105 is to be booted can be performed by the pre-OS management component 101 in various ways. In one embodiment, the pre-OS management component 101 enumerates the Peripheral Component Interface (PCI) bus (not illustrated) on the client 107. The enumeration of the PCI bus is performed differently under different operating systems. On Windows, for example, one way of doing this is via the registry key HKEY_LOCAL_MACHINE\SYSTEM\CurrentControlSet\Enum\PCI. Other techniques can be also be utilized to enumerate the PCI bus under Windows, as well as under other operating systems. Furthermore, the pre-OS management component 101 can use other techniques to inventory the installed hardware devices 113 on the client 107, such as locating all Windows hardware identifiers (Hardware IDs), enumerating a USB or other type of bus, etc. The implementation mechanics for detecting installed hardware devices 113 on computers running various OSs are known to those of ordinary skill in the relevant art, and the use thereof within the context of the present invention will be readily apparent to such ordinarily skilled artisans in light of this specification.

The pre-OS management component 101 can detect which drivers 111 are installed in the pre-OS 105 either before or after ensuring that the pre-OS 105 files are present on the client 107. One option is for the pre-OS management component 101 to automatically scan the appropriate pre-OS 105 files, and utilize the format of the specific pre-OS 105 to detect which drivers 111 are present. For example, version 2.0 of WinPE includes a directory labeled "driverdatabase," which contains a separate ".inf" file describing each installed driver 111. Thus, under WinPE 2.0, the pre-OS management component 101 can read the .inf files located in the driverdatabase directory to automatically determine which drivers 111 are installed.

Identifying drivers 111 present in the pre-OS 105 can also be done manually. For example, a human analyst 203 can manually document all of the drivers 111 that are present in the pre-OS 105, and input this data to the pre-OS management component 101. In the case of either automatic or manual driver 111 detection, once the determination of the drivers 111 present in the pre-OS 105 has been made, a listing of the results can be maintained, for example in a dedicated, driver listing file 201. Such a driver listing file 201 typically includes a listing of which drivers 111 are present in the pre-OS 105. The driver listing file 201 can be stored on the client 107 or server 103, as desired. In one embodiment of the present invention which utilizes such a driver listing file 201, the pre-OS management component 101 looks for this file 201 when performing check to determine which drivers 111 are installed in the pre-OS 105. If a driver listing file 201 is found, the pre-OS management component 101 parses it to determine which drivers 111 are present. In the case in which no driver listing file 201 is found, the pre-OS management component 101 can execute the more detailed steps described above to determine which drivers 111 are present, and create the file 201 to store the results of this determination.

Once the pre-OS management component 101 has identified the drivers 111 installed in the pre-OS 105 and the hardware devices 113 present on the client 107, the pre-OS management component 101 can determine whether any critical drivers 111 (i.e., drivers 111 for critical hardware devices 113) are missing. For example, the pre-OS management component 101 can match PCI class codes and/or vendor and device codes for the detected devices 113 to detected installed drivers 111, to determine whether a given hardware device 113 has a corresponding driver 111. As is understood by those of ordinary skill in the relevant art, whereas vendor codes and device codes specify a specific device 113, PCI class codes give the class or type of hardware device 113 (e.g., "mass storage IDE controller" or "network device ethernet"). Although vendor and device codes are more specific, in some instances a PCI class code provides enough information for the pre-OS management component 101 to match a detected device 113 to a driver 111. For example, as explained below, knowing that a detected device 113 is of type "mass storage IDE controller" can be enough information to match the device 113 to an IDE controller device driver 111.

It is to be understood that what constitutes a "critical" hardware device 113 is a design parameter, and can vary between embodiments as well as target pre-OSs 105. In one embodiment, all mass storage devices 113 and network devices 113 are considered to be critical. In some embodiments, not all network devices 113 are classified as critical, but only a single network device 113 (thereby ensuring that the pre-OS 105 can communicate with the network 109). In one embodiment, the network device 113 communicating with the server 103 at the time the pre-OS management component 101 performs the matching is classified as the single critical network device 113. Likewise, in some embodiments not all mass storage devices 113 are classified as critical, but only, e.g., one target storage device 113 (identified, e.g., by model/serial number). Note that a standard IDE controller device driver 111 can typically be used for any IDE controller (mass storage) device 113, as a default. In one embodiment, where no dedicated driver 111 is present for a detected IDE mass storage device 113, the Pre-OS management component 101 can determine whether a standard IDE device driver 111 is installed or known to be present in the pre-OS 105.

Figure 3:
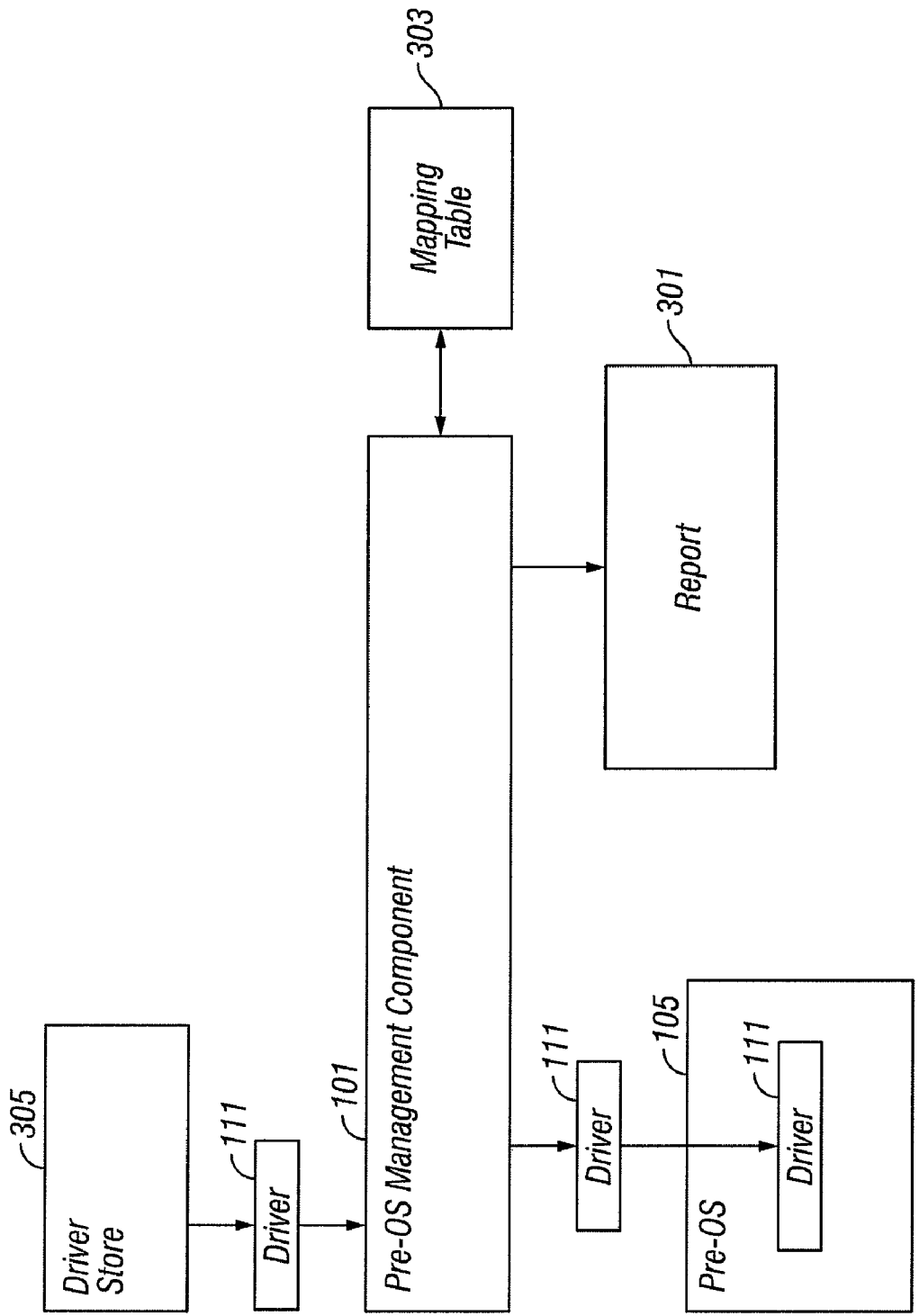
FIG. 3 is a block diagram illustrating a pre-OS management component responding to detecting missing critical drivers on a client, according to some embodiments of the present invention.

If no critical drivers 111 are missing, the pre-OS 105 can boot on the client 107. However, turning to FIG. 3, if any missing critical drivers 111 are identified, the pre-OS management component 101 either generates a report 301 listing the missing drivers 111, or attempts to obtain and install them. In one embodiment, an entry is created in a report 301 for each critical device 113 on the client that does not have a corresponding driver 111 installed in the pre-OS 105. The entry describes the required driver 111, so that the user can obtain it. In one embodiment, the pre-OS management component 101 reads the "DeviceDesc" field in the corresponding registry value under the Enum\PCI key to obtain a description of the device 113 for which no driver 111 is installed, and includes this description (or an edited version thereof) in the report 301. In other embodiments, descriptions of critical devices 201 lacking drivers are obtained other ways, for example from a table 303 of known PCI vendor/device code to string mappings.

In one embodiment, the pre-OS management component 101 obtains and installs missing drivers 111 for critical devices 113. To do so, the pre-OS management component 101 can download drivers 111 from, for example, a central driver store 305 before booting into the pre-OS 105. The pre-OS management component 101 causes the downloaded driver(s) 111 to be installed into the pre-OS 105 (either before booting into the pre-OS 105 or during pre-OS 105 startup). The implementation mechanics for this step vary between different pre-OSs 105. For example, under WinPE, the pre-OS management component 101 can either build the downloaded driver(s) 111 into the pre-OS 105 image, or use Windows tools to load the drivers 111 into a built pre-OS 105 image. Under Linux based pre-OSs 105, the pre-OS management component 101 can compile the obtained driver(s) 111 into the pre-OS 105 before booting.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies, data structures and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software components of the present invention can be instantiated (for example as object code or executable images) within the memory of any computing device, such that when the processor of the computing device processes the components, the computing device executes their associated functionality. As used herein, the terms "computer," "client," "client computer," "server," "server computer" and "computing device" mean one or more computers configured and/or programmed to execute the described functionality. Accordingly, the disclosure of the present invention is intended to be illustrative, but not limiting, of the scope of the invention, which is set forth in the following claims.

What is claimed is:

1. A computer implemented method for ensuring that drivers for critical hardware devices are present in a pre-OS prior to booting, the method comprising the steps of:

ensuring, by a computer, that files comprising a pre-OS are available to a client computer on which the pre-OS is to be booted;

identifying, by a computer, hardware devices that are physically present on the client computer on which the pre-OS is to be booted;

classifying, by a computer, at least one identified hardware device as being a critical hardware device;

detecting, by a computer, device drivers that are installed in the pre-OS;

determining, by a computer, whether a device driver for each critical hardware device is installed in the pre-OS; and responsive to a device driver for at least one identified critical hardware device not being installed in the pre-OS, generating a report, by a computer, the generated report describing critical device drivers not installed in the pre-OS.

2. The method of claim 1 wherein ensuring, by a computer, that files comprising a pre-OS are available to the client computer on which the pre-OS is to be booted further comprises:

transmitting, by a computer, files comprising a pre-OS to the client computer on which the pre-OS is to be booted, over a network.

3. The method of claim 1 wherein identifying, by a computer, hardware devices that are physically present on the client computer on which the pre-OS is to be booted further comprises:

enumerating, by a computer, a Peripheral Component Interface bus of the client computer on which the pre-OS is to be booted.

4. The method of claim 1 wherein identifying, by a computer, hardware devices that are physically present on the client computer on which the pre-OS is to be booted further comprises:

locating, by a computer, operating system level hardware identifiers on the client computer on which the pre-OS is to be booted.

5. The method of claim 1 wherein classifying, by a computer, at least one identified hardware device as being a critical hardware device further comprises:

classifying at least one identified mass storage device and at least one identified network device as being critical, by a computer.

6. The method of claim 1 wherein detecting, by a computer, device drivers that are installed in the pre-OS further comprises:

automatically scanning, by a computer, files comprising the pre-OS;
automatically identifying, by a computer, device drivers installed in the pre-OS.

7. The method of claim 1 wherein detecting, by a computer, device drivers that are installed in the pre-OS further comprises:

receiving, by a computer, entered input identifying device drivers installed in the pre-OS.

8. The method of claim 1 wherein detecting, by a computer, device drivers that are installed in the pre-OS further comprises:

reading, by a computer, a stored listing of device drivers installed in the pre-OS.

9. The method of claim 1 further comprising:

storing, by a computer, a listing of device drivers detected as being installed in the pre-OS.

10. The method of claim 1 further comprising:

responsive to a device driver for at least one identified critical hardware device not being installed in the pre-OS, automatically obtaining a driver for each identified critical hardware device not being installed in the pre-OS, by a computer;
automatically installing, by a computer, each obtained driver in the pre-OS; and
booting, by a computer, into the pre-OS on the client computer.

11. At least one non-transitory computer readable storage medium containing a computer program product for ensuring that drivers for critical hardware devices are present in a pre-OS prior to booting, the computer program product comprising:

program code for identifying hardware devices that are physically present on the client computer on which the pre-OS is to be booted;
program code for classifying at least one identified hardware device as being a critical hardware device;
program code for detecting device drivers that are installed in the pre-OS;
program code for determining whether a device driver for each critical hardware device is installed in the pre-OS; and
program code for, responsive to a device driver for at least one identified critical hardware device not being installed in the pre-OS, generating a report, the generated report describing critical device drivers not installed in the pre-OS.

12. The computer program product of claim 11 further comprising program code for ensuring that files comprising a pre-OS are present on the client computer.

13. The computer program product of claim 11 wherein the program code for identifying hardware devices that are physically present on the client computer on which the pre-OS is to be booted further comprises program code for performing at least one step for a group of steps consisting of:

enumerating a Peripheral Component Interface bus of the client computer on which the pre-OS is to be booted; and
locating operating system level hardware identifiers on the client computer on which the pre-OS is to be booted.

14. The computer program product of claim 11 wherein the program code for classifying at least one identified hardware device as being a critical hardware device further comprises program code for performing at least one step for a group of steps consisting of:

classifying all identified mass storage devices and network devices as being critical; and
classifying at least one identified mass storage device and at least one identified network device as being critical.

15. The computer program product of claim 11 wherein the program code for detecting device drivers that are installed in the pre-OS further comprises program code for performing at least one step for a group of steps consisting of:

automatically scanning files comprising the pre-OS and identifying device drivers installed in the pre-OS;
receiving entered input identifying device drivers installed in the pre-OS; and
reading a stored listing of device drivers installed in the pre-OS.

16. The computer program product of claim 11 further comprising:

program code for storing a listing of device drivers detected as being installed in the pre-OS.

17. The computer program product of claim 11 further comprising:

responsive to a device driver for at least one identified critical hardware device not being installed in the pre-OS, automatically obtaining a driver for each identified critical hardware device not being installed in the pre-OS, automatically installing each obtained driver in the pre-OS, and booting into the pre-OS on the client computer.

18. A computer system for ensuring that drivers for critical hardware devices are present in a pre-OS prior to booting, the computer system comprising:

a processor;
computer memory;
a pre-OS management component within the memory of the computer system, such that when the processor of the computer system processes the pre-OS system management component, the computer system executes a method comprising the steps of:
identifying hardware devices that are physically present on the client computer on which the pre-OS is to be booted;
classifying at least one identified hardware device as being a critical hardware device;
detecting device drivers that are installed in the pre-OS;
determining whether a device driver for each critical hardware device is installed in the pre-OS; and
responsive to a device driver for at least one identified critical hardware device not being installed in the pre-OS, generating a report, by a computer, the generated report describing critical device drivers not installed in the pre-OS.

19. The computer system of claim 18 wherein when the processor of the computer system processes the pre-OS management component, the computer system executes the following additional method steps:

responsive to a device driver for at least one identified critical hardware device not being installed in the pre-OS, automatically obtaining a driver for each identified critical hardware device not being installed in the pre-OS;

automatically installing each obtained driver in the pre-OS; and booting into the pre-OS on the client computer.

* * * * *